United States Patent [19]

Bacquie et al.

[11] 4,321,855
[45] Mar. 30, 1982

[54] DRIVE-ASSISTING SYSTEM COMPRISING AT LEAST A FLUID ENGINE

[75] Inventors: Serge B. Bacquie; Jean M. R. Rouillard, both of La Croix St Ouen, France

[73] Assignee: Poclain Hydraulics, Verberie, France

[21] Appl. No.: 114,715

[22] Filed: Jan. 23, 1980

[30] Foreign Application Priority Data

Jan. 29, 1979 [FR] France ............................... 79 02225

[51] Int. Cl.³ ............................................ F15B 13/02
[52] U.S. Cl. ...................................... 91/436; 91/451; 91/452; 137/596.12
[58] Field of Search ......................... 91/436, 451, 452; 137/596.12

[56] References Cited

U.S. PATENT DOCUMENTS 3,125,324 3/1964 Vivier ............................... 91/452 X
3,690,099 9/1972 Sarnik et al. .

FOREIGN PATENT DOCUMENTS 1404537 5/1965 France .

Primary Examiner—Gerald A. Michalsky

Attorney, Agent, or Firm—Shenier & O'Connor

[57] ABSTRACT

The invention relates to a drive-assisting device comprising at least a fluid relief engine, a source of pressurized fluid, an engine supply pipe connecting the delivery connector of the fluid source to the inlet connector of the engine, and a calibrated discharge valve, shunt-connected to the supply pipe and provided with means for adjusting its calibration, the control of which is deliberate.

Another calibrated discharge valve, so-called check valve, is positioned on the release pipe and is provided with means for adjusting its calibration, the control of which is also deliberate, the calibration control means of the two valves being synchronized by way of a single manipulator with two separate ranges of operation separated by a neutral range, each one of the non-neutral ranges corresponding to substantially nil calibration pressures for one of the valves, and to non-nil calibration pressure for the other, and vice-versa, the neutral range corresponding to a substantially nil calibration pressure for each valve.

An application of the invention is found to relieve the drive of a trailer pulled by a tractor.

6 Claims, 1 Drawing Figure

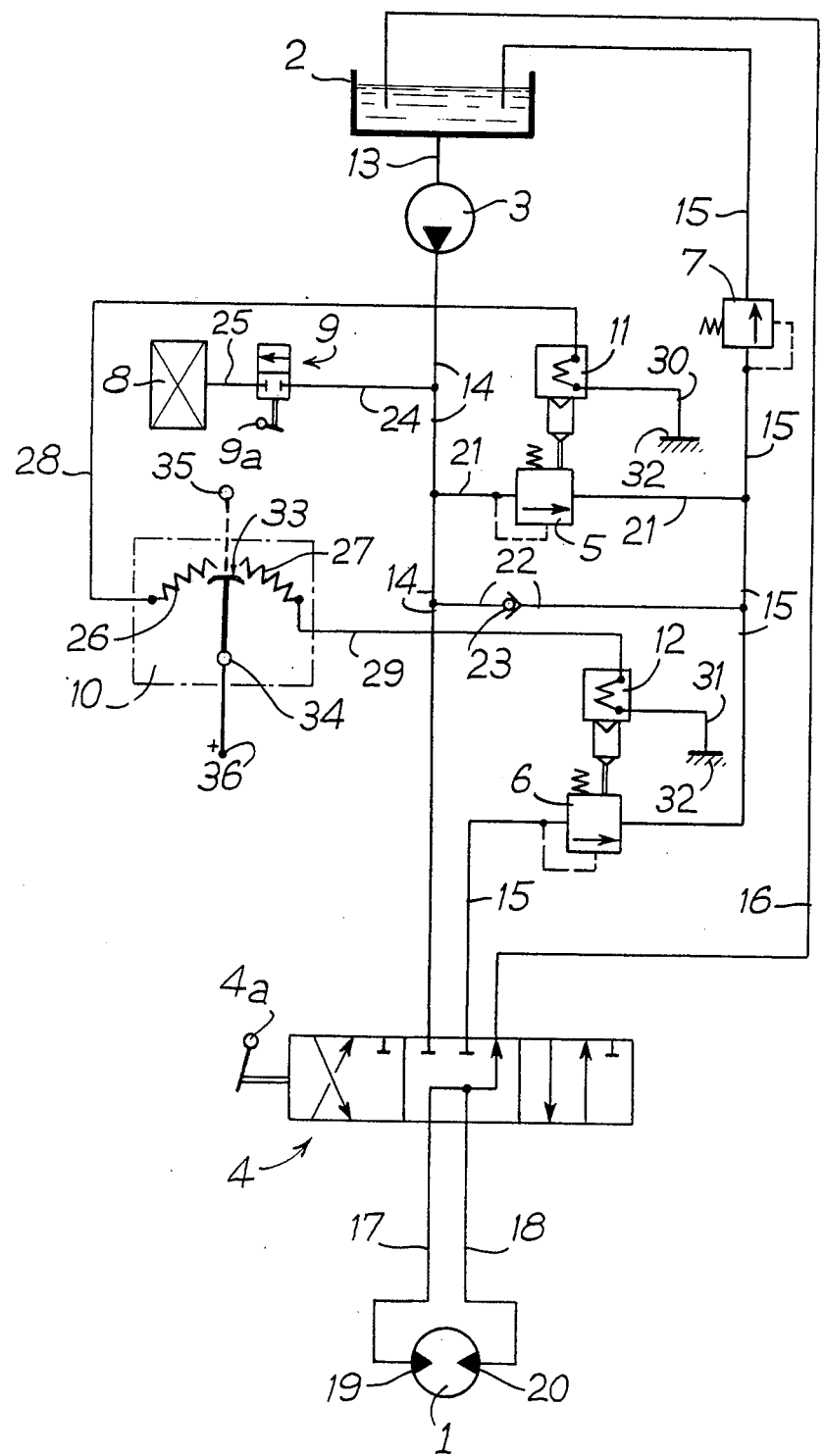

DRIVE-ASSISTING SYSTEM COMPRISING AT LEAST A FLUID ENGINE

Vehicles are already known which, being normally driven by a heat engine, are provided with drive-assisting means to help their movement when moving conditions become difficult. For example, public works machines consisting of a tractor and a trailer of heavy tonnage, have the wheels of their trailer provided with hydraulic drive engines, the aim of which is to cause the said wheels to move only when the corresponding machine is on bumpy ground on a working site.

The control of such hydraulic relief engines should be supple and continuous and should permit to partly power the trailer, as well as to combat the tendency of said trailer to come in front, or across the tractor, when the loaded machine is going down a slope.

It is the object of the invention to propose a complete relief device, assisting as well as holding back when going down a slope, and presenting other advantages to be subsequently defined. It is to be further noted that, although the problem, raised initially and which has led to the definition of the present invention, was that of towed trailers adapted to move over bumpy ground, the field of application of the invention is not limited to solving the said problem, but on the contrary covers any applications where the characteristics of assistance, holding back, etc. of the invention are sought.

The invention therefore relates to a drive-assisting means comprising at least:
a fluid relief engine,
a source of pressurized fluid,
an engine supply pipe connecting the delivery connector of the fluid source to the engine inlet pipe, and,
a calibrated discharge valve, so-called relief valve which is shunt-connected to the supply pipe and which is provided with means for adjusting its calibration, the control of which is deliberate.

Said relief device comprises a release pipe from the engine, on which is positioned another calibrated discharge valve, so-called check valve, which is provided with means for adjusting its calibration, the control of which is also deliberate, the calibration-adjusting controls of both the relief and check valves being synchronized by means of one manipulator with two separate operating ranges separated by a neutral range, one of the operating ranges corresponding to substantially nil pressures for one of the valves, and to non-nil pressures for the other valve, the other operating range corresponding to substantially nil calibration pressures for the said other valve and to non-nil pressures for the complementary valve, and, the neutral range corresponding to a substantially nil calibration pressure for each valve.

The following advantageous arrangements are also preferably adopted:
a fluid distributor, with at least two positions, is interposed on the supply and exhaust pipes to ensure, in a first position, the continuity of each of the said pipes, and, in a second position, the communication between the parts of said pipes situated between the said distributor and the motor, and their communication with a non-pressurized fluid reservoir;

on the release pipe, and downstream of the check valve with respect to the motor, is placed a third discharge valve, calibrated at a low pressure, and so-called complementary valve, whereas a complementary pipe connects the supply and exhaust pipes by being connected to the latter between the check valve and the complementary valve and whereas a non-return valve is arranged on the said complementary pipe and allows the fluid to flow only from the release pipe towards the supply pipe;

a fluid distributor with at least two positions is interposed on the supply and release pipes to ensure, in a first position, the continuity of each of these two pipes, and, in a second position, the blocking of the supply pipe, whereas a by-pass connects that part of the supply pipe situated between the fluid source and the distributor to a working circuit.

The invention will be more readily understood on reading the following description with reference to the accompanying drawing which illustrates the diagram of a relief device according to the invention.

The device described is that of a hydraulic engine 1, with which is provided one of the wheels of a public works trailer, the said trailer being further coupled to a conventional articulated vehicle or tractor. Said trailer of course comprises more than one wheel, and in general it comprises two sets of two wheels on either side, namely a total of four sets of wheels. Each one of these sets can be coupled to a hydraulic engine, such as engine 1.

The illustrated device comprises:
a hydraulic fluid reservoir 2,
a hydraulic pump 3,
a three-position distributor 4,
a first calibrated discharge valve 5, so-called relief valve,
a second calibrated discharge valve 6, so-called check valve,
a third calibrated discharge valve 7, so-called complementary valve,
a working circuit 8, such as a clam operating cylinder separate from the motor 1,
a two-position distributor 9,
an electrical manipulator 10, and
(electro-magnetic) members 11 and 12 for adjusting the calibration pressure of the relief valve 5 and check valve 6, respectively.

All these elements are connected as follows:
the induction pipe 13 of the pump 3 connects said pump to the reservoir 2,
the delivery pipe 14 of the pump 3 connects the said pump to the distributor 4 and constitutes a fluid supply pipe,
a release pipe 15 connects the distributor 4 to the reservoir 2,
a pressure-free return pipe 16 connects also the distributor 4 to the reservoir 2,
two pipes 17 and 18 connect the distributor 4 to the two main connectors 19 and 20 of the engine 1 which is a reversible engine,
the check valve 6 and the complementary valve 7 being positioned in succession on the release pipe 15 from the distributor 4, a connecting pipe 21 connects the delivery pipe 14 to the part of the release pipe 15 which is situated between the said check valve and the said complementary valve, whereas the relief valve 5 is positioned on the pipe 21 so as to allow the flow of the fluid from the delivery pipe 14 towards the release pipe 15,
a complementary pipe 22 connects the part of the release pipe 15 which is situated between the check valve 6 and the complementary valve 7 to the delivery pipe 14, whereas a non-return valve 23 is positioned on the said complementary pipe, to allow the flow of fluid only towards the delivery pipe 14, a shunt pipe 24 connects the two-position distributor 9 with the delivery pipe 14, another pipe 25 connects the said distributor 9 with the working circuit 8.

As diagrammatically illustrated, the manipulator 10 comprises two separate windings 26 and 27 connected by electrical cables or wires 28, 29 to one terminal of the control members 11, 12 respectively, the other terminal of the said control members being connected (30, 31) to the earth 32. A cursor 33, pivotally mounted in 34, is coupled to a hand-operated control lever 35 and is adapted to contact with either one of the two windings 26, 27, or else, in the middle position of the said lever 35, to have no contact with either of the said two windings (this last arrangement being illustrated in the Figure). Said cursor is further connected to a source of electrical power 36.

Orders of magnitude of the calibration pressures of the different valves should also be specified:

for the relief valve 5: between 0 and 500 bars, depending on the excitation of the control member 11, for the check valve 6: between 0 and 500 bars, depending on the excitation of the control member 12, for the complementary valve 7: 10 bars.

Finally, in known manner, the distributors 4 and 9 are provided with control levers 4a, 9a respectively.

The three positions of the distributor 4 correspond:

the first position, to creating a communication between the pipes 14 and 17, and between pipes 18 and 15 and to blocking the pipe 16, the second position, to creating a communication between the pipes 17, 18 and 16, and to blocking the pipes 14 and 15, and the third position, to creating a communication between the pipes 14 and 18, and between the pipes 17 and 15, and, to blocking the pipe 16.

The two positions of the distributor 9 correspond, the first position, to blocking the pipes 24 and 25, and, the second position, to creating a communication between the said pipes 24 and 25.

The described device operates as follows. Its operation involves several remarkable phases which correspond to special combinations of the selected positions of the two distributors.

Relief operation:

the distributors 4 and 9 are placed in their respective first position. In this way, the fluid delivered by the pump 3 and contained in the pipes 14 and 17 drives the relief engine 1 of the trailer in a certain direction, which is that of the forward motion of the trailer. The value of the maximum torque of the engine 1 depends on the maximum pressure prevailing in the pipe 14. Now, said maximum pressure is equal to the calibration pressure of the valve 5. Said pressure varies between 0 and 500 bars, when the cursor 33 of the manipulator 10 moves on the winding 26 from its neutral position in the middle. The value of the assisting torque of the engine 1 thus varies between 0 and the maximum torque value corresponding to a fluid pressure equal to 500 bars. The relief is therefore adjustable and can also act in backward motion.

Check operation:

the distributors 4 and 9 are placed in their first respective positions. The cursor 33 is placed on the winding 27 and allows the calibration pressure of the check valve 6 to be adjusted to a value between 0 and 500 bars. Of course, the higher the value, the greater the effort needed to overcome the pressure of the fluid released from the engine 1 via the pipe 18 and flowing through the pipe 15 beyond the check valve 6. The engine 1 then acts as a brake. It should be noted that when the calibration pressure of either one of the relief valve 5 or check valve 6 is not nil, that of the other valve is nil. Indeed, the manipulator 10 is produced in such a way that the cursor 33 is simultaneously in contact with only one of the windings 26, 27, and therefore controls the excitation of only one of the control members 11, 12.

This arrangement is advantageous, as it would hardly be conceivable to relieve and to check at the same time, both these operations being antinomic. But the said arrangement is further advantageous when in service, because, in the case of a trailer pulled by a tractor, the driver of the machine may have to alter his control almost instantaneously from relief to check, and vice-versa, and he can do so simply by actuating the one lever 35. The check operation is advantageous as it can prevent the trailer from being positioned crosswise with respect to the moving direction of the tractor when going downhill.

It can be noted that in the "check" operation, the pressure in the pipe 14 can be very low, and could sometimes be too low to avoid the cavitation of the engine 1. For this reason, it is advantageous to supply the inlet of the engine with an adequate complementary flow: the complementary valve 7 and the pipe 22 allowing this complementary supply.

Finally, the following two points should also be noted when the distributor 4 is in its second position:

on the one hand, the engine 1 freewheels, its inlet 19 and outlet 20 being in communication together and with the reservoir 2;

on the other hand, the pipe 14 is blocked, making the flow delivered by the pump 3 available for another use; such other use can be found in the working system 8 when the distributor 9 is in its second position.

The invention is not limited to the embodiment described hereinabove, but on the contrary covers any modifications which could be made thereto without departing from its scope or its spirit.

What is claimed is:

1. A drive-assisting device comprising at least:

a fluid relief engine (1) having an inlet (19), a source of pressurized fluid (3) having a delivery connector, an engine supply pipe (14-17) connecting the delivery connector of the fluid source to the engine inlet (19), and a calibrated discharge valve (5), so-called relief valve which is shunt connected (21) to the supply pipe (14) and which is provided with means (11) for adjusting its calibration, wherein said device comprises, in known manner, a release pipe (18-15) of the engine, on which is positioned another calibrated discharge valve (6), so-called check valve, which is provided with means (12) for adjusting its calibration, control means (10) for said calibration adjusting means of said relief and check valves, the calibration-adjusting control means (10) of both the relief and check valves being synchronized by means of one manipulator (35) with two separate operating ranges (26 and 27) separated by a neutral range, one of the operating ranges corresponding to substantially nil pressures for one of the valves, and to non-nil pressures for the other valve, the other operating range corresponding to substantially nil calibration pressures for the said other valve and to non-nil pressures for the complementary valve, and, the neutral range corresponding to a substantially nil calibration pressure for each valve.

2. A drive-assisting device as claimed in claim 1, wherein said source of pressurized fluid includes a non-pressurized fluid reservoir (2), said device including a fluid distributor (4) with at least two positions interposed on the supply (14-17) and exhaust (18-15) pipes, said distributor establishing in a first position a connection between the two parts {(14-17) and (18-15)} of each of the said supply and exhaust pipes, respectively, and, in a second position, a connection between the parts (17 and 18) of said pipes situated between the said distributor (4) and the motor (1), and said non-pressurized fluid reservoir (2).

3. A drive-assisting device as claimed in any one of the claims 1 and 2, wherein on the exhaust pipe (18-15), and downstream of the check valve (6) with respect to the motor (1), is placed a third discharge valve (7), calibrated at a low pressure, and so-called complementary valve, whereas a complementary pipe (22) connects the supply (14) and exhaust (15) pipes by being connected to the latter between the check valve (6) and the complementary valve (7) and whereas a non-return valve (23) is arranged on the said complementary pipe (22) and allows the fluid to flow only from the exhaust pipe (15) towards the supply pipe (14).

4. A drive-assisting device as claimed in claim 2 including a working circuit (8) and a shunt pipe (24-25) connecting that part of the supply pipe situated between the fluid source (3) and the distributor (4) to said working circuit (8) with said distributor in said second position in which second position, further, said distributor obturates said supply pipe (14).

5. A drive-assisted device as claimed in claim 1 wherein on the exhaust pipe (18-15), and downstream of the check valve (6) with respect to the motor (1), is placed a third discharge valve (7), calibrated at a low pressure, and so-called complimentary valve, whereas a complementary pipe (22) connects the supply (14) and exhaust (15) pipes by being connected to the latter between the check valve (6) and the complementary valve (7) and whereas a nonreturn valve (23) is arranged on the said complementary pipe (22) and allows the fluid to flow only from the exhaust pipe (15) toward the supply pipe (14), said device including a working circuit (8), and a shunt pipe (24-25) connecting that part of the supply pipe situated between the fluid source and a distributor (4) to said working circuit (8), said distributor (4) with at least two positions being interposed on the supply (14-17) and exhaust (18-15) pipes and, in a first position, establishing a connection between the two points {(14-17) and (18-15)} of each of the said supply and exhaust pipes, respectively, and, in a second position, obturating said supply pipe (14).

6. A drive-assisted device as claimed in claim 1, wherein said source of pressurized fluid includes a non-pressurized fluid reservoir (2), said device including a fluid distributor (4), with at least two positions, interposed on the supply (14-17) and exhaust (15-18) pipes, said distributor establishing in a first position a connection between the two parts {(14-17) and (18-15)} of each of said supply and exhaust pipes, and, in a second position a connection between the parts (17 and 18) of said pipes situated between the said distributor (4) and motor (1), and said non-pressurized fluid reservoir (2), and wherein on the exhaust pipe (18-15), and downstream of the check valve (6) with respect to the motor (1), is placed a third discharge valve (7), calibrated at a low pressure, and so-called complimentary valve, whereas a complementary pipe (22) connects the supply (14) and exhaust (15) pipes by being connected to the latter between the check valve (6) and the complementary valve (7) and whereas a non-return valve (23) is arranged on the said complementary pipe (22) and allows the fluid to flow only from the exhaust pipe (15) toward the supply pipe (14), said device including a working circuit (8), and a shunt pipe (24-25) connecting that part of the supply pipe situated between the fluid source and the distributor (4) to said working circuit (8), with said distributor in said second position, in which said second position, further, said distributor obturates said supply pipe (14).

* * * * *